(12) United States Patent
Morinaga et al.

(10) Patent No.: US 7,330,648 B2
(45) Date of Patent: Feb. 12, 2008

(54) OPTICAL MODULE

(75) Inventors: Shinji Morinaga, Chiba (JP);
Toshihiko Nakagawara, Chiba (JP)

(73) Assignee: Seiko Precision Inc., Chiba (JP)

( * ) Notice: Subject to any disclaimer, the term of this patent is extended or adjusted under 35 U.S.C. 154(b) by 0 days.

(21) Appl. No.: 11/408,422

(22) Filed: Apr. 21, 2006

(65) Prior Publication Data

US 2006/0216014 A1   Sep. 28, 2006

Related U.S. Application Data

(63) Continuation of application No. PCT/JP2004/015017, filed on Oct. 12, 2004.

(30) Foreign Application Priority Data

Oct. 22, 2003   (JP) .............................. 2003-361444

(51) Int. Cl.
*G03B 3/00* (2006.01)
*G02B 7/04* (2006.01)
*H04N 5/262* (2006.01)

(52) U.S. Cl. ................................... 396/144; 348/240.3

(58) Field of Classification Search ................ 396/144, 396/535; 348/240.3
See application file for complete search history.

(56) References Cited

U.S. PATENT DOCUMENTS 4,799,073 A * 1/1989 Asano et al. ................. 396/72
5,592,250 A * 1/1997 Shimizu ....................... 396/79
5,937,215 A * 8/1999 Mogamiya ................... 396/85
7,127,162 B2 * 10/2006 Mano .......................... 396/144
7,197,240 B2 * 3/2007 Uemura et al. ............... 396/72

FOREIGN PATENT DOCUMENTS

| JP | 7-63972 | 3/1995 |
|---|---|---|
| JP | 2003-90950 A | 3/2003 |
| JP | 2003-279827 A | 10/2003 |

OTHER PUBLICATIONS

International Search Report for PCT/JP2004/015017, dated Jan. 18, 2005.

* cited by examiner

*Primary Examiner*—Christopher Mahoney
(74) *Attorney, Agent, or Firm*—Michaud-Duffy Group LLP (57) ABSTRACT

There is provided an optical module having a circuit board that includes an imaging element, a lens barrel that is fixed onto the circuit board to movably accommodate a lens holder having a lens that forms an image on an imaging surface of an imaging element in a light axis direction, a cylindrical cam having a cam surface engaged with a protrusion disposed in the outside of the lens barrel and extending from a side face of the lens holder to move the lens holder, and a drive section in which an actuator drives the cylindrical cam via a gear train and also having a cover that integrally covers the lens barrel and the actuator and determines the positional relationship between the lens barrel and the drive section.

9 Claims, 8 Drawing Sheets

OPTICAL MODULE

CROSS REFERENCE TO RELATED APPLICATIONS

This application is a continuation of and claims priority to International Patent Application No. PCT/JP2004/015017 filed on Oct. 12, 2004, which claims priority to Japanese Patent Application No. 2003-361444 filed on Oct. 22, 2003, subject matter of these patent documents is incorporated by reference herein in its entirety.

BACKGROUND OF THE INVENTION

1. Field of the Invention

The present invention relates to an optical module included in a miniature camera using imaging elements, such as a charge-coupled device (CCD).

2. Description of the Related Art

In recent years, electronic devices, such as mobile phones and laptop computers that employ a miniature camera, are being provided. There is a great demand for miniaturization and weight-saving of these electronic devices. The downsizing and weight-saving of the cameras installed within these devices are also required. Thus, there is a need to further downsize the optical module which is an optical component of the camera.

With regard to the optical module, a configuration having a lens holder that holds a lens, a lens barrel that stores the lens holder to allow movement, a cylindrical cam that has a cam groove that engages with an engaging pin extending from a side surface of the lens holder and moves the lens holder in a light axis direction, and an actuator that drives the cylindrical cam has been conventionally implemented. Even in a miniaturized optical module, the basic structure described above is the same and these plural components must be assembled accurately. In the optical module installed in mobile phones and the like, in particular, it is vital that the cylindrical cam is disposed after the lens barrel is accurately positioned in relation to the CCD disposed on a circuit board, and in addition, that the actuator is disposed so that driving force is efficiently transmitted to the cylindrical cam, etc. In the miniaturized optical module, even a minuscule misalignment can cause degradation of a captured image, and thus, assembly has to be performed with care.

Japanese Patent Application Publication No. 7-63972 (hereinafter, referred to as Patent Document 1) discloses an optical module. In the Patent Document 1, a disposal relationship of a common lens barrel and actuator (motor) included in the optical module is shown. Conventionally, a method has been implemented, in which the lens barrel and the motor are constructed separately, and assembled and attached to a frame. This method also applies to the construction of the miniaturized optical module. The lens barrel and a miniature motor are constructed separately and joined on the circuit board, thus forming one optical module. When an assembly configuration as such is implemented, holes and pins for positioning or a guide pin for positioning are arranged on the circuit board and the motor is mounted in the predetermined position.

However, in the configuration in which the lens barrel and the motor are assembled and attached separately, the lens barrel is fixed to the circuit board first and the position of the lens barrel becomes the base. The position of the lens barrel is decided in relation to the CCD and fixed to the circuit board. Specifically, the lens barrel is disposed so that the CCD on the circuit board is in focus. However, in many instances, the position of the lens barrel becomes deviated from the planned position during the actual assembly and attachment operation. If a misalignment exceeds an acceptable error limit, the error must be corrected by adjustment of the lens barrel to the center of the CCD or adjustment of the position of lens barrel based on the outward form of the CCD.

When the configuration in which the lens barrel and the motor are composed separately and assembled and attached to the circuit board, as such, is implemented, the disposal position of the actuator is determined under the premise that the lens barrel is disposed in the predetermined position on the circuit board. However, the position of the lens barrel often becomes out of alignment during the actual assembly and attachment. If the position of the lens barrel is misaligned as such, the position of the cylindrical cam set in the lens barrel also becomes misaligned. As a result, a situation occurs in which relative positions of the cylindrical cam and the motor are out of the designed range. The optical module that has been out of alignment during assembly cannot efficiently transmit the driving force of the motor to the cylindrical cam-side and cannot maintain predetermined capability.

SUMMARY OF THE INVENTION

It is therefore an object of the present invention to provide an optical module having a configuration in which the relative positions of the lens barrel and the drive section side can be assembled and maintained as planned.

The afore-described object can be achieved by an optical module including: a circuit board that includes an imaging element; a lens barrel that is fixed onto the circuit board to movably accommodate a lens holder having a lens that forms an image on an imaging surface of an imaging element in a light axis direction; a cylindrical cam having a cam surface engaged with a protrusion disposed in the outside of the lens barrel and extending from a side face of the lens holder to move the lens holder; a drive section in which an actuator drives the cylindrical cam via a gear train; and a cover that integrally covers the lens barrel and the actuator and determines the positional relationship between the lens barrel and the drive section. In accordance with the present invention, the relative positions of the lens barrel and the drive section are set by a positioning member. Therefore, if the lens barrel is misaligned during assembly and attachment, the position of the drive section also becomes misaligned. Since the relative positions of both members remain unchanged, the relative positions of the cylindrical cam set based on the lens barrel and the gear train included in the drive section are also similarly maintained. Thus, the optical module realizes a configuration in which the cylindrical cam can be driven according to an intended design.

The afore-described object can also be achieved by a portable electronic device having the afore-described optical module.

An optical module can be assembled by including the steps of: assembling an imaging forming section that includes a circuit board having an imaging element, a lens barrel that is fixed onto the circuit board to movably accommodate a lens holder having a lens that forms an image on an imaging surface of the imaging element in a light axis direction, and a cylindrical cam having a cam surface engaged with a protrusion disposed in the outside of the lens barrel and extending from a side face of the lens holder to move the lens holder; assembling a drive section that includes a cover having a through-hole that penetrates the lens barrel, an actuator that is set on the cover, and a gear train that is disposed on the cover to transmit a driving force of the actuator; and inserting the lens barrel in the through-hole, engaging the cylindrical cam and the gear train, and combining the imaging forming section and the drive section.

BRIEF DESCRIPTION OF THE DRAWINGS

Preferred embodiments of the present invention will be described in detail with reference to the following drawings, wherein.

Other objects, features and advantages of the present invention will become more apparent from the following detailed description when read in conjunction with the accompanying drawings, in which.

DESCRIPTION OF THE PREFERRED EMBODIMENTS

Figure 1:
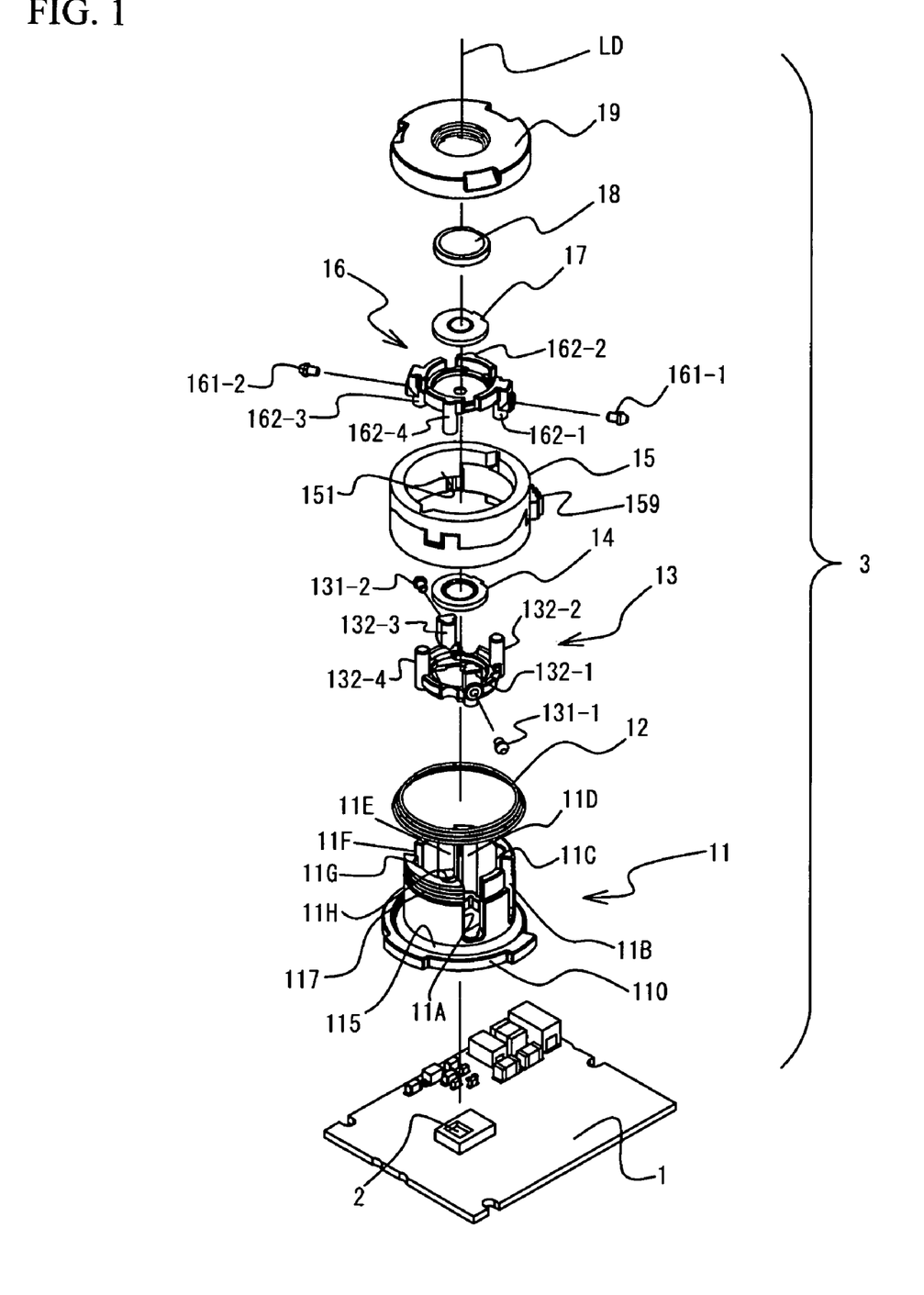
FIG. 1 is an exploded perspective view showing the interior of an optical module according to an embodiment.

The following is a description of an embodiment of the present invention, with reference to the accompanying drawings. FIG. 1 is an exploded perspective view showing the interior of an optical module according to the embodiment. In FIG. 1, filters, aperture, etc., that intervene midway are omitted to facilitate understanding of the characteristic configuration. A CCD 2 serving as an imaging element is fixed onto a circuit board 1, on which a predetermined wiring pattern is formed. A flexible printed circuit board (FPC board), for example, can be implemented as the circuit board 1. An optical unit 3 is disposed so that a captured image is formed onto the CCD 2 disposed on the circuit board 1. The optical module described in the present specification can be perceived as a configuration including the optical unit 3 and an actuator, described hereafter, and can also be perceived as a configuration that also includes the circuit board 1. Hereinafter, a configuration included in the optical unit, a cylindrical cam preferable for implementation in the optical unit, and a positioning configuration preferable for implementation in the optical unit will be explained sequentially.

(Optical Unit Configuration)

The optical unit 3 includes, from the circuit board 1 side, a lens barrel 11, a ring-shaped conical coil spring 12 as an elastic member, a third lens holder 13, a third lens 14, a cylindrical cam 15, a second lens holder 16, a second lens 17, a first lens 18, and a first lens holder 19.

The lens barrel 11 has a base plate 110 on the bottom side. The lens barrel substantially has a cylindrical shape and is disposed to surround the CCD 2, fixed onto the circuit board 1, with the CCD 2 in the center. An opening (not shown) shaped to correspond to the shape of the CCD 2 is formed in the base plate 110. When the lens barrel 11 is set on the circuit board 1, the CCD 2 is fitted into the opening of the base plate 110. In addition, the base plate 110 is formed into a disc-shape larger than the main cylinder portion of the lens barrel 11, and the outer peripheral portion thereof protrudes and is a flange portion 115. As explained hereafter, the coil spring 12 is mounted onto the flange portion 115.

Multiple guide grooves 11A through 11H are formed on a side wall of the lens barrel 11. Four guide grooves 11A, 11B, 11E, and 11F, among the guide grooves, are partially cut into the side wall of the lens barrel and formed as long groove portions extending in a light axis direction LD. Although the guide grooves 11A to 11F will be explained hereafter, four guide grooves 11A, 11C, 11E, and 11G are formed to guide the third lens holder 13, and the other four guide grooves 11B, 11D, 11F, and 11H are formed to guide the second lens holder 16.

The coil spring 12 is ring-shaped and formed into a conical form, in which the winding radius increases towards the lower portion. The coil spring 12 is fitted onto the outer peripheral of the main cylinder portion of the lens barrel 11 and is mounted onto the flange portion 115, as explained earlier. When the relative positions of the CCD 2, disposed on the circuit board 1, and the lens are misaligned during manufacturing process, the focusing position of the lens (back focus) becomes misaligned with a light-receiving surface of the CCD 2, and thus, a clear image cannot be obtained. Therefore, the present optical module is configured in such a manner that the cylindrical cam 15 guiding the lens is biased to the first lens holder 19 and the position of the first lens holder is adjusted so that the focusing position can be aligned with the light-receiving surface by adjustment of the lens position. Specifically, the bottom portion of the cylindrical cam 15 is supported by the coil spring 12 and is biased towards the first lens holder 19 positioned thereabove. The afore-described configuration is capable of stabilizing the lens position in the light axis direction LD of the cylindrical cam 15.

The upper surface of the cylindrical cam 15 contacts the lower surface of the first lens holder 19 and stabilizes the lens position, as explained above. This configuration will be explained in further detail. The upper surface of the cylindrical cam 15 is formed to be plane, as shown in FIG. 1. The lower surface of the first lens holder 19, contacting the upper surface of the cylindrical cam 15, is also formed to be plane. As explained hereafter, the cylindrical cam 15 rotates, and thus, the lower surface of the first lens holder, contacting the upper surface of the cylindrical cam 15, is a sliding surface. At the same time, the first lens holder 19 is fixed onto the upper portion of the lens barrel 11 when the optical module is assembled. More specifically, a female threaded portion (not shown) that threadedly engages with a male threaded portion 117 formed on the upper outer peripheral of the lens barrel 11 is formed on the inner wall of the first lens holder 19.

The lens barrel 11 is provided on the circuit board 1. The first lens holder 19 is fixed onto the top portion of the lens barrel 11. Thus, the position of the first lens holder 19 in the light axis direction LD from the circuit board 1 can be held constant. The position of the cylindrical cam 15 in the light axis direction LD can be stabilized by the cylindrical cam 15 pressing the first lens holder 19 using the coil spring 12. As explained hereafter, the lens holders 13 and 16, holding the lenses 14 and 17, are engaged to the cylindrical cam 15, and the movements thereof are controlled. The position of the cylindrical cam 15 is kept stable, and thus, the positions of the plurality of lenses 14 and 17 in the light axis direction can be held in the intended position via the cylindrical cam 15.

In particular, in the present embodiment, the first lens holder 19 is threadedly engaged to the upper portion of the lens barrel 11 by a screw, and thus, the height position of the cylindrical cam 15 can be easily changed by rotation of the first lens holder. Therefore, even if the back focus becomes out of focus by an error in the assembly and attachment of the CCD 2 to the circuit board, the back focus can be easily corrected by the rotation of the first lens holder 19. In the present optical unit 3, errors in the components and during assembly and attachment can be easily corrected by the rotation of the first lens holder 19 on the upper portion of the lens barrel 11.

As explained above, the present optical module accurately positions to the first lens holder 19, which serves as the base, by a simple devisal in which the coil spring 12 is disposed beneath the cylindrical cam 15. As a result, a configuration in which the CCD 2 disposed on the circuit board is focused accurately without changes to cam curves, etc., as in the conventional configuration, can be actualized.

In addition, because the coil spring 12 is formed into a conical form, the coil spring 12 contacts the bottom portion of the cylindrical cam 15 over a wide area and biases upward. Because the coil spring 12 has a conical form, compressed height during compression can be reduced because the disposal configuration is that in which a coil is not present directly under the coil. In other words, the coil spring 12 is formed to allow disposal in a narrow space. In addition, the protruding portion is deformed to sink down and become plane when a load is applied to the coil spring 12, and thus, the coil spring 12 can be deformed to be even lower during operation. Therefore, the coil spring 12 is characterized by the ability to withstand a relatively large load with a small dimension. Although the conical coil spring 12 is implemented in the present embodiment, a so-called volute spring in which a board spring is wound into a spiral can be implemented similarly.

The cylindrical cam 15 is disposed so as to surround the outer peripheral of the lens barrel 11. A plurality of cam grooves (cam surface) 151 is formed on the inner wall of the cylindrical cam 15. Engaging pins are provided on the third lens holder 13 and the second lens holder 16 as protruding members that engage with the cam grooves 151. Specifically, the third lens holder 13 has two engaging pins 131-1 and 131-2 that protrude in the radius direction, and the second lens holder 16 similarly has two engaging pins 161-1 and 161-2 that protrude in the radius direction. The shapes of the cam grooves 151 are regulated so as to move in a predetermined trajectory with the engaging pins as cam followers. A description will be given of the relationships between the cam grooves 151 of the cylindrical cam 15, and the engaging pins 131-1, 131-2 and the engaging pins 161-1 and 161-2.

A rack portion 159, indicated by a reference numeral 159, is formed on the outer peripheral of the cylindrical cam 15. The rack portion 159 meshes with a gear on the driving side, not shown in FIG. 1. As a result, the cylindrical cam 15 rotates with the light axis direction LD as the center of rotation. The third lens holder 13 and the second lens holder 16 move along the light axis direction LD based on this operation.

Next, the lenses included in the optical unit 3 and the lens holders holding the lenses will be explained. The third lens 14 is a correction lens disposed in a position closest to the circuit board 1 and held by the third lens holder 13. The second lens 17 is a variable-power lens that disposed in the middle and held by the second lens holder 16. The first lens 18 is an objective lens positioned on the subject side and held by the first lens holder 19. The third lens holder 13 and the second lens 17 are moved to a desired position in the light axis direction LD by the cam grooves 151 formed on the inner wall of the cylindrical cam 15 stored within the lens barrel 11. As a result, the distance between the third lens 14 and the circuit board 1 and the distances between each lens 14, 17, and 18 are changed, and thus, imaging can be performed by the focal distance being changed from wide (WIDE) to tele (TELE).

Figure 2:
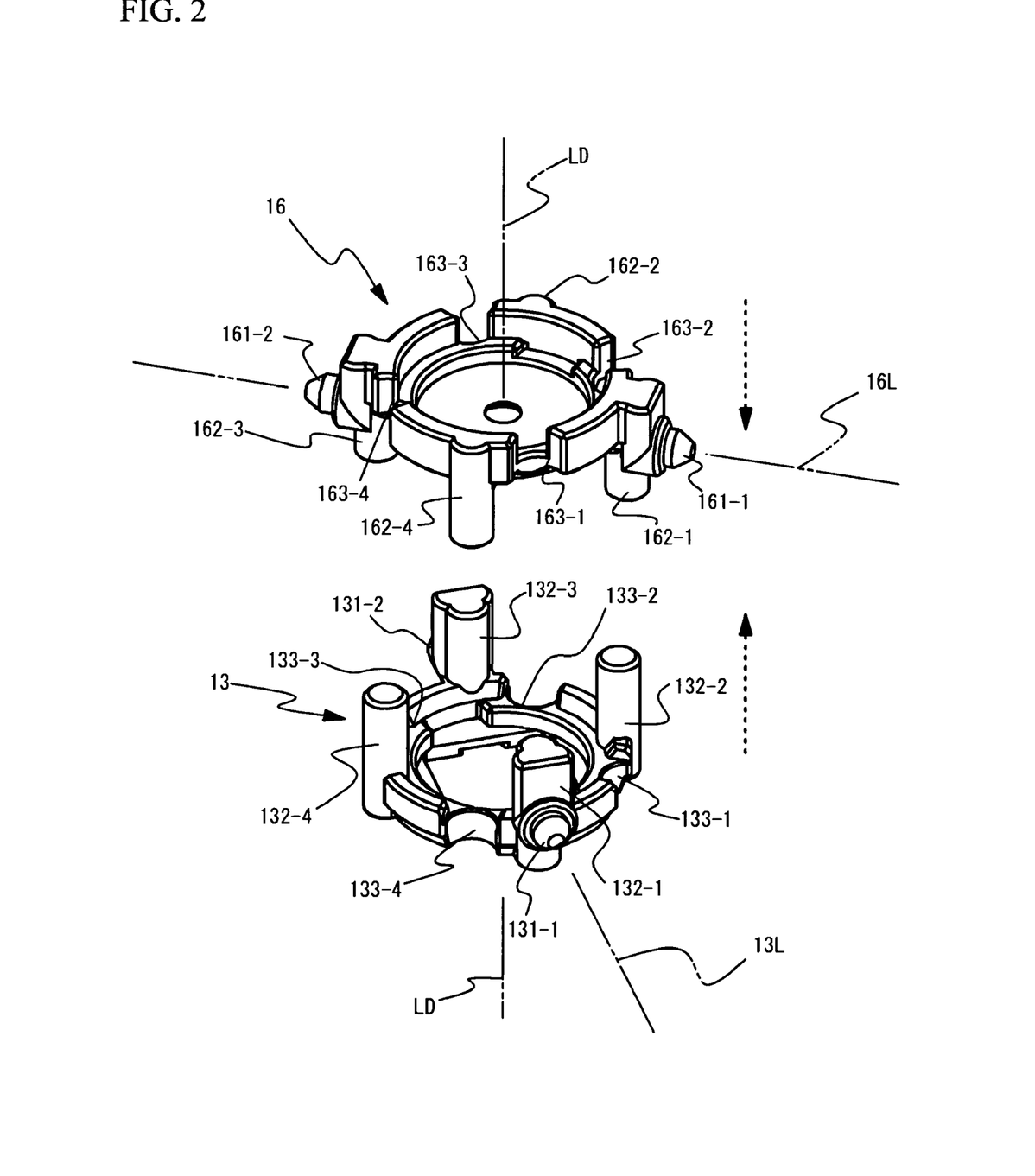
FIG. 2 is a diagram showing an enlargement of a third lens holder and a second lens holder shown in FIG. 1.

FIG. 2 is a diagram showing an enlargement of the third lens holder 13 and second lens holder 16 shown in FIG. 1. The two lens holders are set within the lens barrel 11 so as to approach each other from above and below, and overlap. The two engaging pins 131-1 and 131-2, protruding from the third lens holder 13 in the radius direction, protrude outward from the guide grooves 11A and 11E formed on the lens barrel 11 and engages with the cam grooves 151 of the cylindrical cam 15. Similarly, the two engaging pins 161-1 and 161-2, protruding from the second lens holder 16 in the radius direction, protrude outward from the guide grooves 11C and 11F formed on the lens barrel 11 and engages with the cam grooves 151 of the cylindrical cam 15.

The third lens holder 13 and the second lens holder 16 will be explained sequentially based on FIG. 2, with reference to FIG. 1. Four guide bars 132-1 to 132-4 are formed almost evenly-spaced on the peripheral portion of the third lens holder 13. The four guide bars 132-1 to 132-4 are formed to slide against the guide grooves 11A, 11C, 11E, and 11G formed within the lens barrel 11. The afore-described engaging pins 131-1 and 131-2 protrude in the radius direction from the two guide bars 132-1 and 132-2, among the guide bars. Furthermore, four receiving grooves 133-1 to 133-4 are formed positioned between the guide bars 132 in the peripheral portion of the third lens holder 13. The receiving grooves 133-1 to 133-4 are formed to receive guide bars 162-1 to 162-4 of the second lens holder 16 having the same configuration.

The second lens holder 16 has the same configuration as that of the third lens holder 13, above. In other words, four guide bars 162-1 to 162-4 are formed on the peripheral portion of the second lens holder 16. The guide bars 162-1 to 162-4 are formed to slide against the remaining guide grooves 11B, 11D, 11F, and 11H formed within the lens barrel 11. The pins 161-1 and 161-2 protrude in the radius direction from the two guide bars 162-1 and 162-2, among the guide bars. Furthermore, four receiving grooves 163-1 to 163-4 are formed in the peripheral portion of the second lens holder 16. The receiving grooves 163-1 to 163-4 are formed to receive the guide bars 132-1 to 132-4 of the third lens holder 13.

The third lens holder 13 and the second lens holder 16 form a mutually slidable state by mutually engaging the guide bars and the receiving grooves. Then, each guide bar (132 and 162) of the lens holders 13 and 16 in this state are slidably stored by engagement with the guide grooves 11A to 11H formed on the inner surface of the lens barrel 11. In other words, in the present optical module, each guide bar (132 and 162) of the lens holders 13 and 16 becomes a first guide member and the guide grooves 11A to 11H formed on the sliding surface of the lens barrel 11 become a second guide member, and a guide configuration that slidably holds the lens holders 13 and 16 within the lens barrel 11 is actualized. Thus, the second lens holder 16 and the third lens holder 13 can move relatively in the light axis direction without interfering with each other.

Furthermore, a characteristic configuration of the second lens holder 16 and the third lens holder 13 shown in FIG. 2 is will be explained. The engaging pins 161-1 and 161-2 protruding from the second lens holder 16 are disposed on a straight line 16L in opposite directions. First, the position of the second lens holder is restrained from tilting to the optical direction LD by the disposal of a plurality of engaging pins facing differing directions. In addition, the third lens holder 13 disposed below the second lens holder 16 has the same configuration. The engaging pins 131-1 and 1361-2 are also disposed on a straight line 13L in the opposite directions from the second lens holder 13. In addition, the straight line 16L and the straight line 13L are set to intersect with each other.

Thus, the second lens holder 16 and the third lens holder 13 form a four-point mounting state by mutually engaging the guide bars and the receiving grooves. As a result, the optical axes of the lenses held by both lens holders can be restrained from tilting to the light axis direction LD of the circuit board-side with further certainty. In addition, the lens holder is supported by a plurality of engaging pins as described above, and thus, stress is dispersed and the configuration has a superior anti-shock property when dropped. Also, the guide bars and the receiving grooves are formed in each lens holder 13 and 16, and thus, can be moved closer together. Furthermore, the guide bar can be set longer because there is no interference with the guide bar extending from the other lens holder.

For example, by the lengths of the guide bars 132 and 162 being set to a range within which the second lens holder 16 and the third lens holder 13 move, the second lens holder 16 and the third lens holder 13 will not tilt to the optical direction LD. In addition, by the guide bars 132 and 162 being set to be long, light entering from the guide groove (11A, etc.) provided on the lens barrel 11 side into the lens barrel can be blocked. In addition, a dust-resistant property preventing dust from entering the lens barrel 11 can be attained, as a result.

Figure 3:
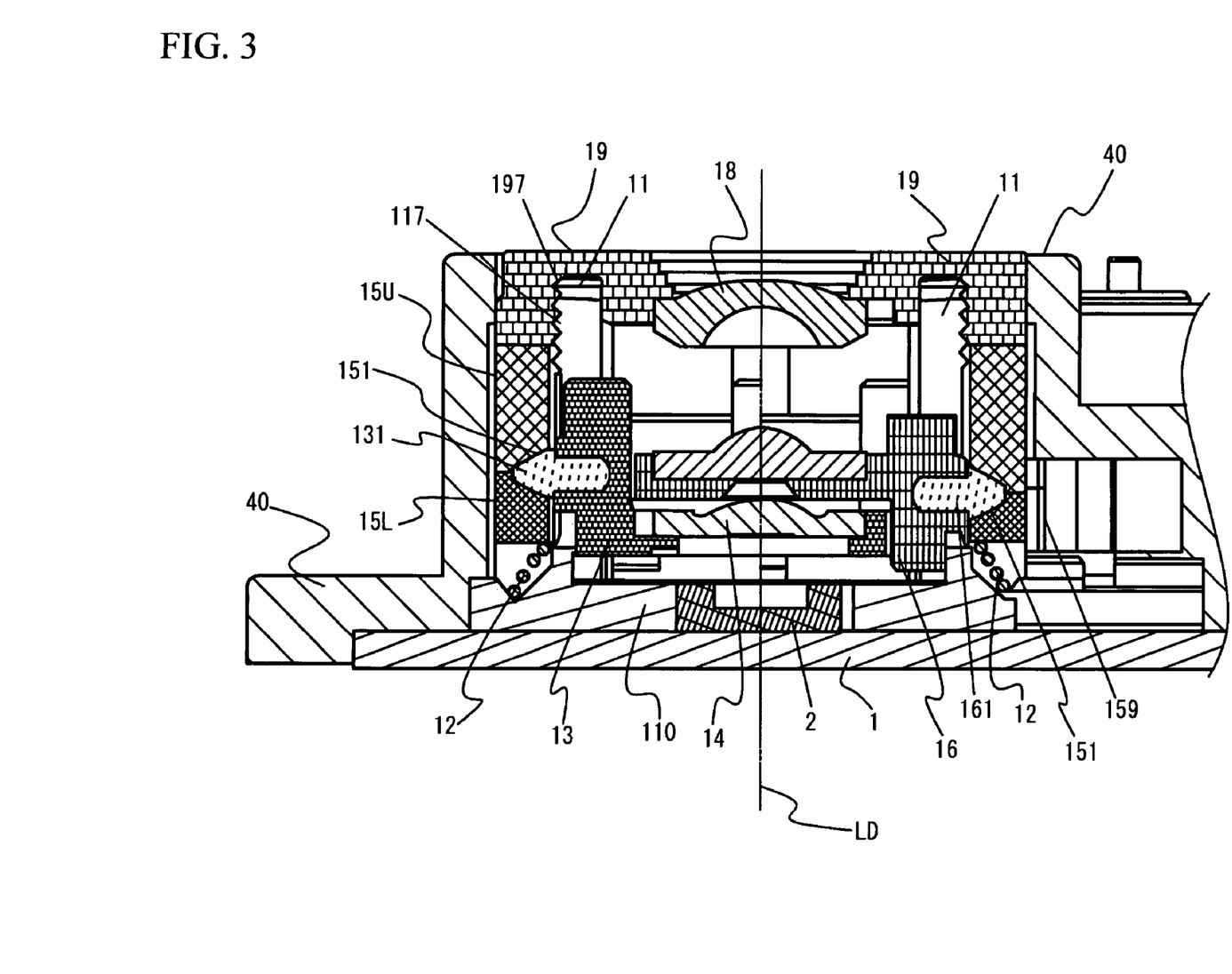
FIG. 3 is a diagram showing a cross-sectional configuration of the optical module in a state in which each component shown in FIG. 1 is assembled and attached.

FIG. 3 is a diagram showing a cross-sectional configuration of the optical module in a state in which each component shown in FIG. 1 is assembled and attached. In FIG. 3, a cover 40 that covers the outer peripheral of the optical unit 3 is shown. The cover 40 will be described hereafter. From FIG. 3, the afore-described configuration in which the cylindrical cam 15 is biased upwards can be seen with further clarity. In other words, the male threaded portion 117 formed on the upper portion of the lens barrel 11 and a female threaded portion 197 formed on the inner wall of the first lens holder 19 that meshes therewith are shown. The uppermost first lens holder 19 is disposed on the upper portion of the lens barrel 11 as such, the cylindrical cam 15 contacts the first lens holder 19 by the bias force of the coil spring 12, and thus, the lens position in the light axis direction LD is decided. Therefore, the position of the third lens 14 can be set by the position of the first lens holder 19. Then, by the rotation of the first lens holder 19 to the lens barrel 11, the back focus position can be positioned to be aligned with the light-receiving surface of the CCD 2.

In addition, in FIG. 3, the engaging pin 131 protruding from the third lens holder 13 in the radius direction and the engaging pin 161 protruding from the third lens holder 16 in the radius direction are shown. Although, as explained earlier, each lens holder 13 and 16 respectively has two engaging pins, one of each is shown in FIG. 3. According to FIG. 3, the engagement of the engaging pins 131 and the engaging pins 161 with the cam grooves 151 formed on the inner wall of the cylindrical cam 15 disposed outside of the lens barrel 11 can be viewed. Because the cylindrical cam 15 is biased upward by the coil spring 12 disposed in the lower portion, the lens holders 13 and 16 move in accompaniment, and the position in the optical direction LD is determined accurately, based on the position of the first lens holder 19.

(Cylindrical Cam)

In the cylindrical cam 15 implemented in the optical unit 3 that is exemplified in the present embodiment, the cam grooves formed on the inner wall thereof have a characteristic configuration. This point will be explained in further detail. In FIG. 3, the configuration of the cylindrical cam 15 is shown in further detail. The cylindrical cam 15 incorporated in the present optical unit 3 is formed by two cam components, an upper cam 15U and a lower cam 15L. To miniaturize the optical module, the cylindrical cam 15 must also be miniaturized. However, the cam grooves 151 for accurately guiding the third lens holder 13 and the second lens holder 16 in the light axis direction LD must be formed on the inner wall of the cylindrical cam 15, as explained above. Therefore, in the present optical unit 3, cam components that are the divided cylindrical cam 15 are combined and constructed.

Figure 4:
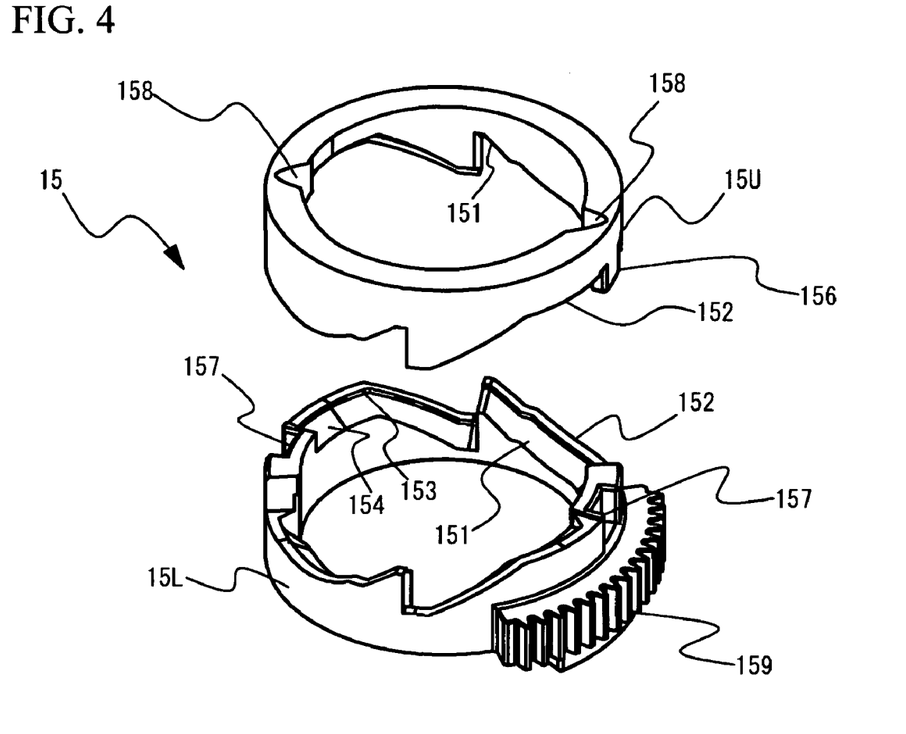
FIG. 4 is an enlarged view of a cylindrical cam shown in FIG. 3 in a state in which the cylindrical cam is divided into two components.

FIG. 4 is an enlarged diagram showing the cylindrical cam 15, shown in FIG. 3, divided into two components, the upper cam 15U and the lower cam 15L. The cylindrical cam 15 is divided into top and bottom portions at the area in which the cam grooves 151 are formed on the inner wall. As explained earlier, the engaging pins 131 of the third lens holder 13 and the engaging pins 161 of the second lens holder 161 are engaged with the cam grooves 151. The cam grooves 151 are formed based on the cam curves (profile) guiding the engaging pins. A dividing line 152 of the upper cam 15U and the lower cam 15L is set so that the shape of the cam curve appears in the end portions.

Thus, the cam grooves 151 are formed in the area in which the upper and lower cams 15U and 15L are connected. Half of the cam grooves 151 is formed on the end surface of one connected cam 15U and the remaining half of the cam groove 151 is formed on the end surface of the other cam 15L. In a configuration as such, the upper cam 15U and the lower cam 15L are respectively constructed using two metal molds and the cylindrical cam 15 can be constructed accurately by aligning the upper and lower cams. Thus, the cylindrical cam 15 can be constructed with relative ease, even when the cam grooves 151 are thin grooves. The present cylindrical cam 15 can be constructed by combining thin and small cam components, by plastic injection molding using metal molds, etc. In addition, undercut processing and the like become unnecessary, and thus, the metal mold structure can be simple. Furthermore, because the dividing line 152 is set along the cam curve, the planned cam curve is not severed. Therefore, the engaging pins 131 and the engaging pins 161 can be guided accurately as with integrally formed cam grooves.

In addition, as shown in FIG. 3, the cross-portion of the head portions of the engaging pins 131 and 161 is a rough triangle, and this portion becomes the cam follower and engages with the cam grooves 151. The cross-section of the cam grooves 151 is formed into a V-shape to correspond with the shape of the engaging pins. The shape of the cam grooves 151 can be seen in FIG. 4. The cam grooves 151 are formed to include a short vertical portion 153 in the center portion and slanting portions 154 provided thereabove and therebelow.

The head portion of the engaging pins 131 and 161 is a slanted oblique cam. The cam grooves 151 are formed to perform guidance with the engaging pins as the cam followers. When the oblique cam is implemented in the head portion of the engaging pins as such, miniaturization can be attempted while securing the thickness of the cylindrical cam 15. In addition, a plane cam in which the cross-section becomes a rectangle can be implemented for the head portion of the engaging pins. In this case, the position accuracy during zoom operation can be enhanced.

A dent portion 158 is formed from the upper surface of the upper cam 15U to the cam grooves 151. In FIG. 4, only the dent portion 158 of the upper cam 15U can be viewed. The dent portion 158 is a guidance groove for guiding the engaging pins 161 of the second lens holder 16 to the cam grooves 151 within the cylindrical cam. The engaging pins 161 are disposed in opposite directions on a straight line, and thus, two dent portions 158 are formed on the upper cam 15U. However, when the third lens holder 13 and the second lens holder 16 are set on the lower cam 15L and then are assembled and attached so as to cover the upper cam 15U, there is no need to form the dent portion 158. In FIG. 4, the cam grooves corresponding to the second lens holder and the cam grooves corresponding to the third lens holder are connected by the guidance grooves guiding the lens holders. The third lens holder is guided to a cam groove that guides the second lens holder from the dent portion 158, passes a guidance groove that is further connected, and reaches a cam groove that guides the third lens holder. Next, the second lens holder is guided from the dent portion 158 and set in the corresponding cam groove.

In addition, a protrusion portion 156 that faces downward is formed in the upper cam 15U, and a cutout portion 157 that receives the protrusion is formed in the other lower cam 15L. The protrusion portion and the cutout portion are similarly formed in the opposite position as well. The upper and lower cams 15U and 15L are connected with the protrusion 156 and the cutout portion 157 as the base position, and the cylindrical cam 15 is constructed. Therefore, the cylindrical cam 15 can be assembled with accuracy and the cam grooves can be disposed on the inner surface with high positional accuracy. Although the upper cam 15U and the lower cam 15L have a configuration that can be driven integrally by fitting, the upper and lower cams can be formed integrally by adhesive, laser depositing, etc.

Figure 5:
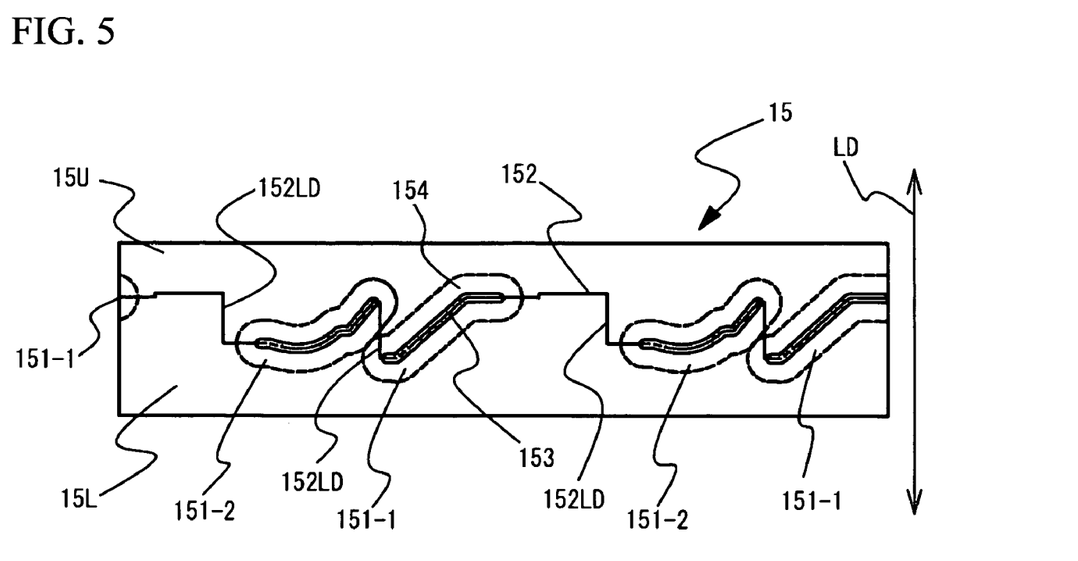
FIG. 5 is a development view showing a cam groove formed on an inner wall of the cylindrical cam with further clarity.

FIG. 5 is a developmental diagram showing the shape of the cam grooves 151 formed on the inner wall of the cylindrical cam 15. According to FIG. 5, the state of the cam grooves 151 formed on the inner wall of the cylindrical cam 15 can be viewed with further clarity. The cam grooves 151 include a cam groove 151-1 and a cam groove 151-2 that are regulated by different cam curves. The cam groove 151-1 regulates the variable-power lens operation corresponding to the second lens holder 16. The cam groove 151-2 regulates the correction lens operation corresponding to the third lens holder 13. In other words, the engaging pins 161-1 and 161-2 of the second lens holder 16 engage with the cam groove 151-1. The engaging pins 131-1 and 131-2 of the third lens holder 13 engage with the cam groove 151-2.

It can be confirmed from FIG. 5 that the dividing line 152 of the upper cam 15U and the lower cam 15L is set to divide along the cam grooves 151-1 and 151-2, described above. In addition, the relationship between the vertical portion 153 and the slanting portion 154 of the cam grooves 151 can also be confirmed according to FIG. 5. Furthermore, although the cam curve portion of the foregoing dividing line 152 is a curved line, the line is straight in non-processed regions that do not form the cam groove. The generation of wasted space can be suppressed by forming the line straight as such. In particular, wasted space in the circumferential direction of the cylindrical cam 15 can be suppressed by the formation of a parallel dividing line portion 152LD that is parallel to the dividing line 152 in the light axis direction LD. However, the dividing line portion 152LD can be slanted if there is some space in the circumferential direction.

As shown in FIG. 5, if a dividing line 152 is formed to include differing cam curves, the cam grooves 151-1 and 151-2 of differing shapes are formed on the cam components connecting portion. In the disposal of cam grooves as such, a configuration can be actualized in which the height of the cylindrical cam is suppressed to a low height and a plurality of lens holders can move in the light axis direction. Thus, the miniaturization of the optical module can be promoted.

Figure 6:
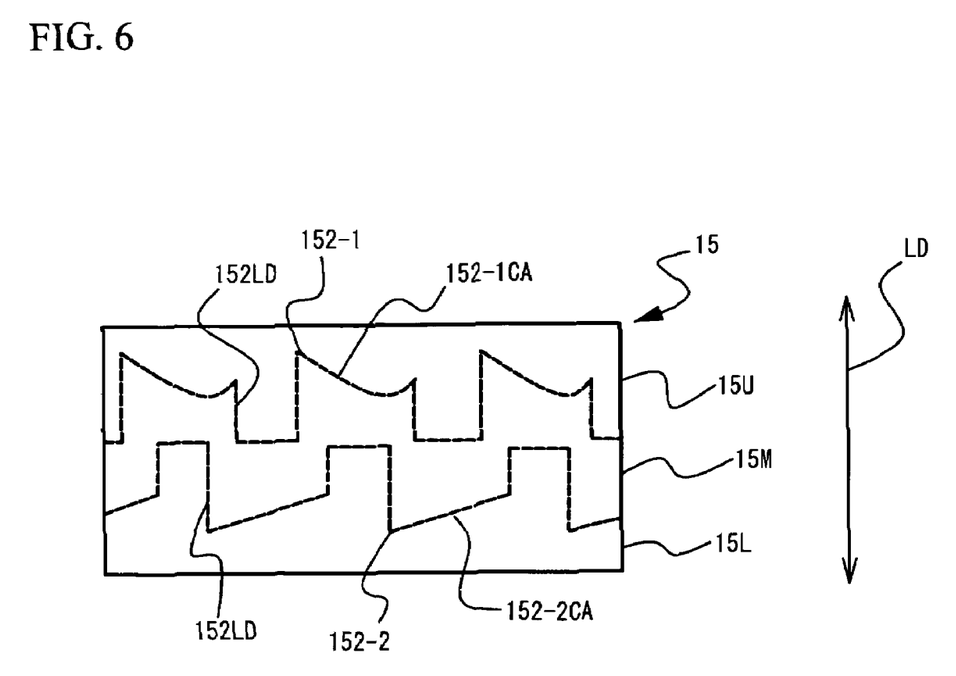
FIG. 6 is a diagram schematically showing a variation of the cylindrical cam formed by a plurality of cam components.

FIG. 6 is a diagram schematically showing a variation of the cylindrical cam 15 formed by a plurality of cam components. The cylindrical cam 15 shown in FIG. 4 and FIG. 5 are composed of two upper and lower cams 15U and 15L. However, FIG. 6 shows an example of when there are three components. The cylindrical cam 15 is composed of three cam components, the upper cam 15U, a middle cam 15M, and the lower cam 15L. The upper cam 15U and the middle cam 15M are divided by a dividing line 152-1. The lower cam 15L and the middle cam 15M are divided by a dividing line 152-2.

The foregoing dividing line 152-1 and dividing line 152-2 are set based on different cam curves. These dividing lines also include the parallel dividing line portion 152LD that is parallel to the light axis direction LD, and wasted space in the circumferential direction is suppressed. In the dividing line 152-1, a curved portion 152-1CA is the original cam curve line. Similarly, in the dividing line 152-2, a curved portion 152-2CA is the original cam curve line. Although only the dividing line is shown in FIG. 6, the cam grooves are formed with the cam curve line in the center, as in FIG. 5. In other words, the cam components are divided along the cam curve line in the present variation as well, and the cam grooves are formed on the end surfaces of each cam component so as to oppose each other. Thus, when these components are set, the cam grooves are formed between the upper cam 15U and the middle cam 15M and between the lower cam L and the middle cam 15M. In the cylindrical cam 15 shown in FIG. 6, the engaging pins from the correction lens holder are set to engage with the curved line portion 152-1CA. Similarly, the engaging pins from the variable-power lens holder are set to engage with the curved line portion 152-2CA.

In addition, the upper cam surface and the lower cam surface can have a V-shaped cross-portion, guide a protruding portion of the lens holder, and dispose the lens holder on the cam surface. In this case, the lens holder can be guided via a concave portion (groove portion) that guides the lens holder in the end portion on the light axis side of the cam 15, a cam surface to which another lens holder is disposed, or a concave portion for guiding another lens holder.

In the cylindrical cam 15 shown in FIG. 6, different cam grooves overlapping in the height direction can be formed. Thus, compared to when cam grooves of differing shapes are simultaneously disposed on one circumference, as shown in FIG. 5, one type of cam groove can be disposed in the circumferential direction with space to spare. Therefore, the rotating angle of the cam can be set to a large angle, and thus, the torque of the actuator can be reduced. Although an example in which the cylindrical cam is composed of three cam components is shown in FIG. 6, the cylindrical cam can be composed of even more divided components. Three pairs of cam curve lines are disposed on one surface in the cylindrical cam 15 shown in FIG. 6, and thus, the degree of freedom of the lens holder is limited. This is advantageous in that the angle of the lens holder to the light axis direction is stabilized. As a result, the number of guide grooves can be reduced.

Figure 7A:
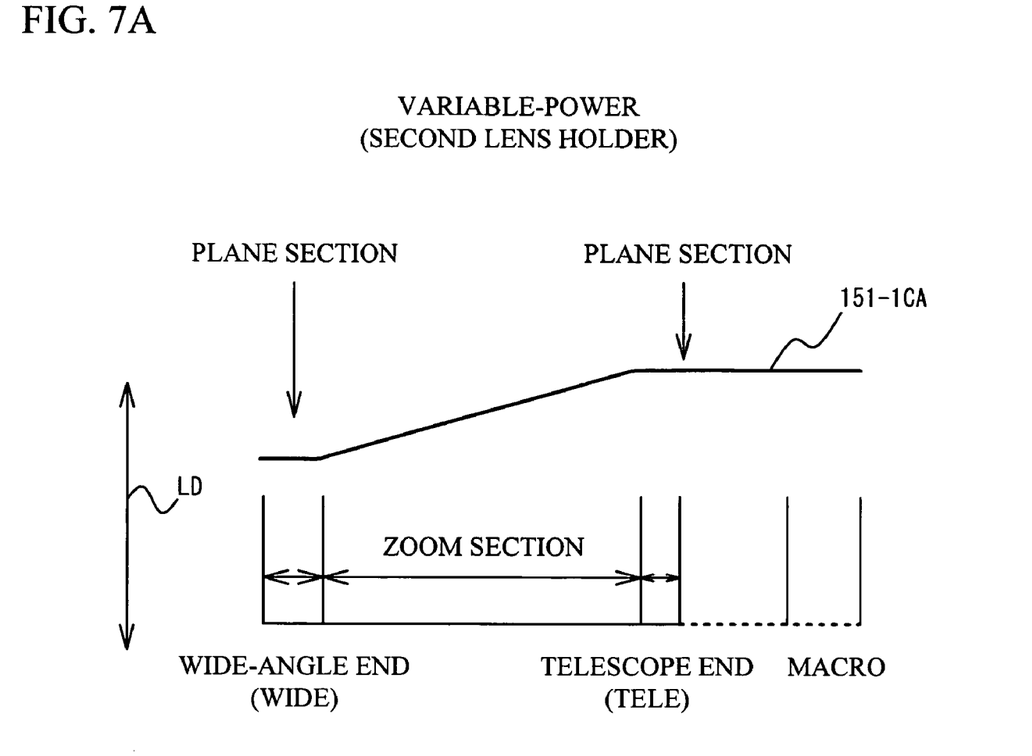
FIG. 7A and FIG. 7B are diagrams showing preferred cam curves (profiles) for regulating cam grooves formed on the inner wall of the cylindrical cam.
Figure 7B:
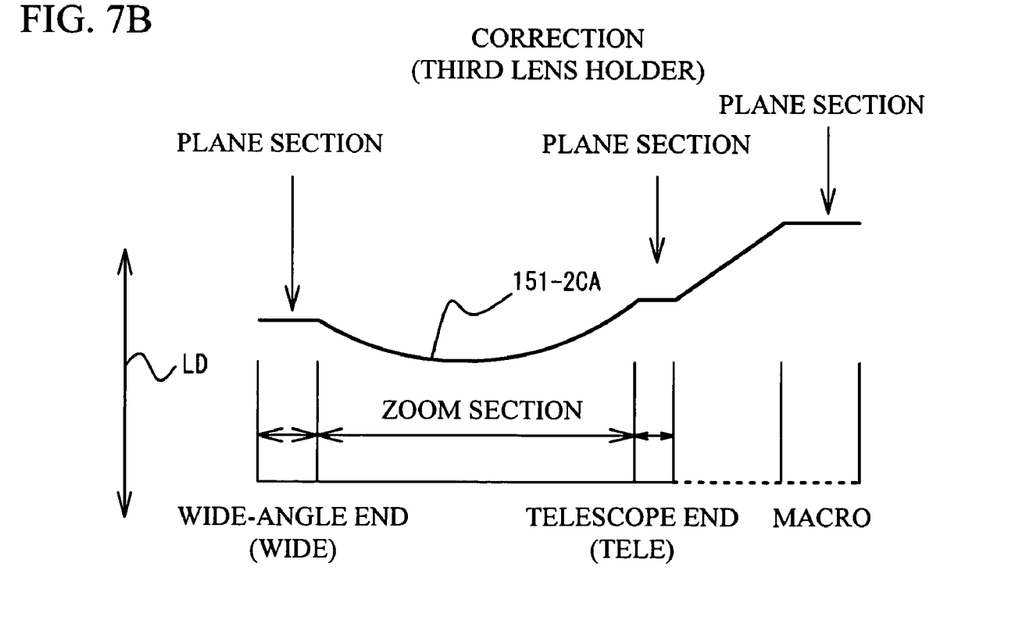

FIG. 7A and FIG. 7B are diagrams showing a preferred cam curve lines (profiles) for regulating the cam grooves formed on the inner wall of the foregoing cylindrical cam 15. FIG. 7A shows the cam curve line 151-1CA that regulates the cam groove 151-1 for the variable-power lens. FIG. 7B shows the cam curve line 151-2CA that regulates the cam groove 151-2 for the correction lens. In other words, the second lens holder 16 is moved in the light axis direction based on the cam curve line 151-1CA. The third lens holder 13 is moved in the light axis direction based on the other cam curve line 151-2CA.

More specifically, the engaging pins 161-1 and 161-2 protruding in the radius direction of the second lens holder are moved in the light axis direction by the cam groove 151-1 regulated by the cam curve line 151-1CA. The engaging pins 131-1 and 131-2 protruding in the radius direction of the third lens holder 13 are moved in the light axis direction by the cam groove 151-2 regulated by the cam curve line 151-2CA. In FIG. 7A and FIG. 7B, cam curve lines when a macro function is added to the telescopic side in addition to a zoom function are exemplified.

The present optical module is downsized to allow installation in mobile phones and the like. When the zoom function is added as described above, it is important to move each lens holder to the intended positions accurately. Therefore, conventionally, a method of disposing a position detecting member for confirming that the lens holder is in a wide-angle position or a telescope position has generally been implemented. However, when the position detecting member is provided separately as such, the optical module becomes larger, going against the request for miniaturization. In addition, the optical module used in mobile phones and the like is extremely small and the perimeter of the cylindrical cam to the angle of circumference is short. Therefore, high-accuracy is required for position detection in the light axis direction of the lens holder to the rotation angle. However, it is difficult to provide a position detecting member. In the cam curve line shown in FIG. 7A and FIG. 7B, the desired characteristic can be achieved without position detection in the wide-angle end and the telescope end, by the provision of a plane section in the variable-power and correction cam curve lines.

In the present optical unit 3, the rack portion 159 is formed on the outer peripheral of the cylindrical cam 15. The driving force of the actuator is transmitted by a gear that meshes with the rack portion 159. It is difficult to eliminate the effect of backlash even when a gear with high dimensional accuracy is implemented. In addition, there is influence from other components and assembly errors as well. In the present optical unit 3, the position detection of a rotating cam cannot be performed with high accuracy because there is no position detecting member. When the cylindrical cam 15 is rotated between the wide-angle end and the telescope end by zoom operation, the cylindrical cam may not be rotated to the desired position in the wide-angle end or the telescope end due to the deviation from the initial position or the effect of backlash, even when rotated by the actuator to a predetermined angle.

Therefore, as shown in FIG. 7A and FIG. 7B, in the present embodiment, cam curve lines having a plane section of a predetermine length and that are perpendicular to the light axis direction LD are implemented on both ends of a curved line portion that moves the lens for zooming (zoom portion), namely, the wide-angle end (wide end) and the telescope end (tele end). In other words, in the present invention, cam curve lines having a plane section as such are implemented as the variable-power and correction cam curve lines of the cylindrical cam 15. As a result, performance at the wide-angle end and the telescope end can be achieved without high-accuracy position detection by the position detecting member, if the lens holder is at the plane section. With regard to the position of the lens holder, the performance at the telescope end can be maintained by moving the lens holder to the plane section of the telescope end, even when the imaging distance is deviated, by driving the actuator when the lens holder is in the plane section of the wide-angle end, taking into consideration the distance of the plane section. Thus, influence due to backlash, assembly error, etc., can be eliminated and the predetermined performance can be achieved stably at the wide-angle and telescope positions.

An example of movement from the wide-angle end to the telescope end will be explained. In the present optical system, the cylindrical cam is moved to the wide-angle-end side to detect the initial position. Then, the initial position is set to a position on the plane section to which the rotation cam is returned to the telescope side from a position where the cylindrical cam stops due to the rotation limit of the cylindrical cam by the provision of drive pulses of only a predetermined number of pulses to the actuator. Therefore, it is expected that the initial position should have a positional error. For example, the rotation angle from the wide-angle end to the telescope end is 500 pulses and the rotation angle of the plane section is 50 pulses. If the initial position is a position 25 pulses from the wide-angle end, 550 pulse driving pulses are applied to move to the telescope end, with the position on the plane part 25 pulses away from the telescope end as the target. Then, if the cylindrical cam is moved within 25 pulses more or less than the target value, the cylindrical cam has been rotationally driven to the telescope end and the desired movement is achieved.

Furthermore, the cam curve line includes a curve line for macro shooting and a plane section on the wide-angle side, as shown in FIG. 7A and FIG. 7B. Also in this case, the macro state is brought after the plane section of the telescope end, thereby coming into focus with accuracy. In addition, given functionalities are achieved in the plane position, enabling a stable operation.

The misalignment of the lens position in the wide-angle position, in the telescope position, and in a macro position can be suppressed by the improvement in which the plane section of a predetermined length is added to a predetermined position on the cam curve line, as described above. In the present configuration, there is no need to newly provide a position detecting member to confirm that the lens is in the wide-angle position, the telescope position, and the macro position. Therefore, the optical module that has a simple configuration attempting miniaturization and cost-reduction and can perform imaging using a zoom function or a macro function with stable wide-angle and telescope can be provided. When cam curve lines for macro are formed consecutively on the plane section on the telescope side as shown in FIG. 7A and FIG. 7B, the macro function can be used stably by absorption of the positional misalignment of the cylindrical cam on the macro side, as well. However, the macro function is not a requisite in the present optical module, and thus, the cam curve line does not have to include the curved line portion for macro.

(Positioning Configuration)

The present optical module further includes a superior configuration that accurately decides the position of the drive section side to the lens barrel 11 side. Hereafter, this point will be explained. The drive section of the present optical module includes the actuator and the gear train, composed of gears. The driving force of the actuator is transmitted to the foregoing cylindrical cam via the gear train, and the cylindrical cam is driven. When the cylindrical cam 15 is driven by the actuator as such, the third lens holder 13 and the second lens holder 16 move in the light axis direction. Then, in the present optical module, a configuration in which the positions of the optical unit 3 and the drive section side are decided via the cover that covers the optical unit 3 is implemented. When a configuration as such is implemented, even when the position of the lens barrel 11 is out of alignment, the position of the drive section side maintains the relative position to the lens barrel 11 and moves in accompaniment. Thus, the configuration facilitates the actualization of the intended performance related to the driving system. In addition, when this configuration is implemented, the cover for the optical unit 3 and the cover for the actuator can be integrated, and thus, space-saving can be attempted.

Figure 8:
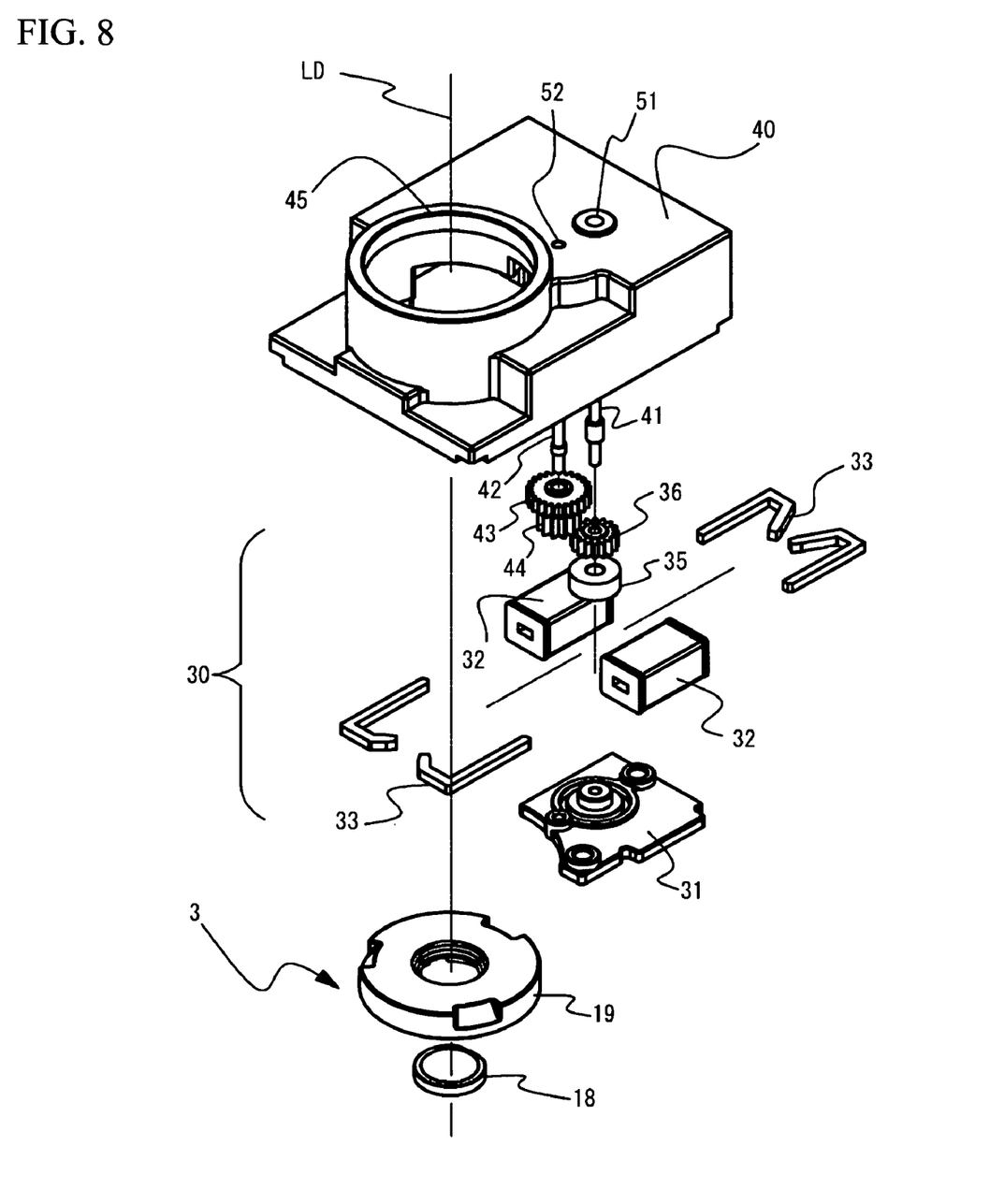
FIG. 8 is a diagram showing a cover that is set on a drive section that drives an optical unit and the optical unit.
Figure 9:
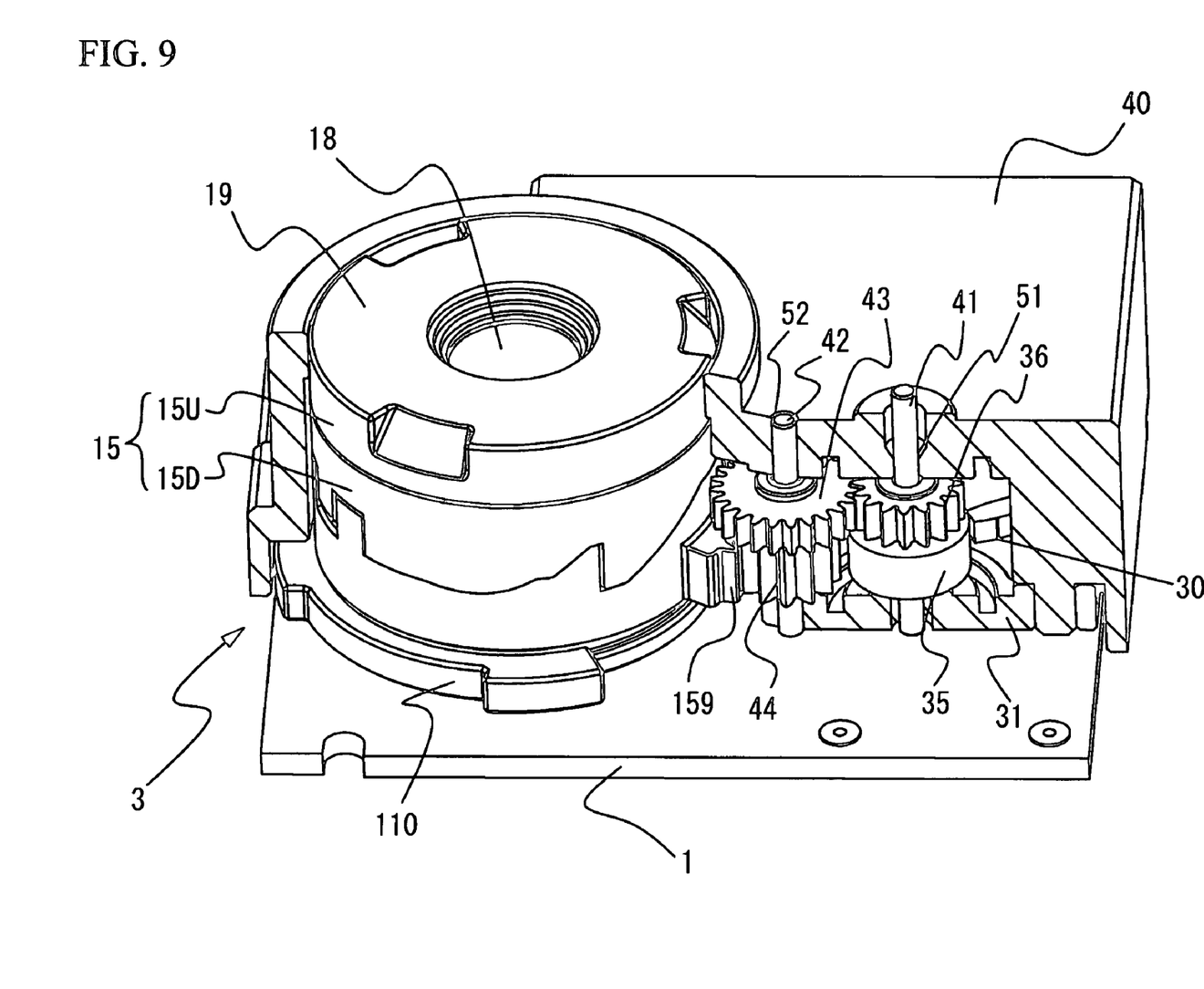
FIG. 9 is a diagram showing a cross-sectional configuration of the optical module in a completed state in which the optical unit and the motor are assembled and attached.

The positioning configuration using the cover 40 as a positioning member, implemented in the present optical module, will be explained with reference to FIG. 8 and FIG. 9. FIG. 8 is a diagram, showing a cover set on the drive section that drives the optical unit 3 and the optical unit 3. FIG. 8 shows the first lens 18 and the first lens holder 19 that are positioned on the upper portion so that the relationship with the foregoing optical unit 3 can be confirmed. FIG. 9 is a diagram showing a cross-sectional configuration of the optical module in a completed state in which the optical unit 3 and a motor 30 as the actuator are assembled and attached.

In the present optical module, the cylindrical cam 15 is driven by the motor 30. In FIG. 8, each component of the motor 30 is shown in an exploded state. The motor 30 is assembled using the cover 40 and a circuit board 31. The cover 40 is set on the circuit board 1 of the optical unit 3. The motor 30 includes a pair of coils 32 and a stator 33, and has a rotor 35 in the center portion.

An axis 41 fixed to a predetermined position on the cover 40 and an axis for the rotor 35 are placed on the same axis and set such that the rotor 35 rotates with the axis 41 as the center of rotation. The axis 41 is set in a hole 51 formed in the cover 40. In addition, a gear 36 that rotates integrally with the rotor 35 is disposed. Furthermore, an axis 42 is fixed to another position on the cover 40. A gear 43 that meshes with the gear 36 and a gear 44 that integrally rotates with the gear 43 are provided on the axis 42. The rack portion 159 formed on the outer peripheral of the cylindrical cam 15 meshes with the gear 44. The axis 42 is set in a hole 52 formed in the cover 40.

FIG. 9 shows a state in which each component shown in FIG. 8 is assembled and attached. As shown in FIG. 9, the first lens holder 19 is fitted into an opening 45 formed on the cover 40. The first lens holder 19 is fixed to the top portion of the lens barrel 11. If the opening 45 (through-hole) of the cover is set to the first lens holder 19, the position of the lens barrel 11 to the cover 40 is determined. In other words, the positions of the lens barrel 11 and the cylindrical cam 15 to the cover 40 are determined via the first lens holder 19.

Meanwhile, the axis 41 and 42 are positioned to the predetermined positions in the cover 40. As shown in FIG. 8, the motor 30 is positioned based on the axis 41. Therefore, in the configuration shown in FIG. 8 and FIG. 9, the relative positions of the lens barrel 11, the cylindrical cam 15 side, the motor 30, and the gear train side, connected thereto, are fixed relationships. Thus, even if the setting position of the lens barrel 11 is misaligned, the position of the drive section side including the motor 30 moves in correspondence with the position of the optical unit 3, via the cover 40. In other words, the relative position relationships of the cylindrical cam 15, the motor 30, and the gear train are maintained and misalignment does not occur.

As described above, in the present optical module, the optical unit 3 side and the drive section side are positioned based on the lens barrel position via the cover 40. Thus, misalignment does not occur between the rack portion 159 provided on the outer peripheral of the cylindrical cam 15 and the gear trains 36, 43, and 44 that transmit the driving force of the motor 30. Therefore, the present optical module implementing the above-described configuration can efficiently transmit the driving force of the motor to the cylindrical cam 15.

In the above-described embodiment, as shown in FIG. 8, the motor 30 and gear trains 36, 43, and 44 are assembled and attached to the cover 40 side in advance. When preparations are made as such, the relative positions of the motor 30 side and the lens barrel 11 side can have a relationship that is as planned, merely by setting the optical unit to the predetermined area of the cover 40. Although the present embodiment exemplifies an optical module using a circuit board, the effect of the use of the foregoing cover is not limited to this configuration. If an optical module does not implement a circuit board, the same effect as that described above can be attained by assembling and attaching a lens barrel and an actuator directly to the cover.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An optical module comprising:
a circuit board that includes an imaging element; a lens barrel that is fixed onto the circuit board to movably accommodate a lens system that forms an image on an imaging surface of the imaging element in a light axis direction;
a cylindrical cam;
a drive section in which an actuator drives the cylindrical cam via a gear train; and
a cover that integrally covers the lens barrel and the actuator and determines the positional relationship between the lens barrel and the drive section;

wherein the lens system comprises a first lens holder comprising a guide bar and having a first lens therein, and a second lens holder comprising a receiving groove and having a second lens therein; and wherein the guide bar is engaged with the receiving groove; and wherein the lens barrel comprises a guide groove; and wherein one of the first lens holder and the second lens holder comprises a guide bar that is engaged with the guide groove; and wherein the cylindrical cam has a cam surface engaged with a protrusion disposed in the outside of the lens barrel and extending from a side face of the first or second lens holder to move the lens holder.

2. The optical module as claimed in claim 1, wherein a through-hole is formed in the cover for positioning the lens barrel.

3. The optical module of claim 1, further comprising a third lens holder having a third lens therein, the third lens holder being mounted on the lens barrel.

4. A portable electronic device comprising an optical module that includes:
  a circuit board that includes an imaging element; a lens barrel that is fixed onto the circuit board to movably accommodate a lens system that forms an image on an imaging surface of the imaging element in a light axis direction;
  a cylindrical cam ;
  a drive section in which an actuator drives the cylindrical cam via a gear train; and
  a cover that integrally covers the lens barrel and the actuator and determines the positional relationship between the lens barrel and the drive section;
  wherein the lens system comprises a first lens holder comprising a guide bar and having a first lens therein, and a second lens holder comprising a receiving groove and having a second lens therein; and
  wherein the guide bar is engaged with the receiving groove; and
  wherein the lens barrel comprises a guide groove; and
  wherein one of the first lens holder and the second lens holder comprises a guide bar that is engaged with the guide groove;
  wherein the cylindrical cam has a cam surface engaged with a protrusion disposed in the outside of the lens barrel and extending from a side face of the first or second lens holder to move the lens holder.

5. The device of claim 4, further comprising a third lens holder having a third lens therein, the third lens holder being mounted on the lens barrel.

6. An assembling method of an optical module comprising the steps of:
  assembling an imaging forming section that includes a circuit board having an imaging element, a lens barrel that is fixed onto the circuit board to movably accommodate a lens holder having a lens that forms an image on an imaging surface of the imaging element in a light axis direction, and a cylindrical cam having a cam surface engaged with a protrusion disposed in the outside of the lens barrel and extending from a side face of the lens holder to move the lens holder;
  assembling a drive section that includes a cover having a through-hole that penetrates the lens barrel, an actuator that is set on the cover, and a gear train that is disposed on the cover to transmit a driving force of the actuator, and
  inserting the lens barrel in the through-hole, engaging the cylindrical cam and the gear train, and combining the imaging forming section and the drive section.

7. The optical module as claimed in claim 6, wherein the actuator and the gear train are assembled in the cover in advance.

8. An optical module comprising:
  a circuit board that includes an imaging element; a lens barrel that is fixed onto the circuit board to movably accommodate a lens system that forms an image on an imaging surface of the imaging element in a light axis direction;
  a cylindrical cam;
  a drive section in which an actuator drives the cylindrical cam via a gear train; and
  a cover that integrally covers the lens barrel and the actuator and determines the positional relationship between the lens barrel and the drive section;
  wherein the lens system comprises two lens holders that are slidably engaged with each other and that each have a lens therein; and
  wherein at least one of the two lens holders is slidably engaged with the lens barrel; and
  wherein the cylindrical cam has a cam surface engaged with a protrusion disposed in the outside of the lens barrel and extending from a side face of at least one of the lens holders to move the lens holder.

9. The module of claim 8, further comprising a third lens holder having a third lens therein, the third lens holder being mounted on the lens barrel.

* * * * *